United States Patent [19]
Barnett

[11] Patent Number: 6,108,236
[45] Date of Patent: Aug. 22, 2000

[54] SMART CARD COMPRISING INTEGRATED CIRCUITRY INCLUDING EPROM AND ERROR CHECK AND CORRECTION SYSTEM

[75] Inventor: Philip C. Barnett, Clanfield, United Kingdom

[73] Assignee: Advanced Technology Materials, Inc., Danbury, Conn.

[21] Appl. No.: 09/118,736

[22] Filed: Jul. 17, 1998

[51] Int. Cl.[7] ................................................. G11C 16/06
[52] U.S. Cl. ..................... 365/185.09; 371/2.1; 371/47.1
[58] Field of Search ..................... 365/185.09; 371/2.1, 371/47.1, 37.8

[56] References Cited

U.S. PATENT DOCUMENTS

| 4,523,314 | 6/1985 | Burns et al. | 371/38 |
|---|---|---|---|
| 5,589,412 | 12/1996 | Iranmenesh | 437/43 |
| 5,596,530 | 1/1997 | Lin et al. | 365/185.29 |
| 5,600,166 | 2/1997 | Clementi et al. | 257/324 |
| 5,604,880 | 2/1997 | Dipert | 395/430 |
| 5,612,913 | 3/1997 | Cappelletti et al. | 365/185.12 |
| 5,615,153 | 3/1997 | Yiu et al. | 365/185.19 |
| 5,618,742 | 4/1997 | Shone et al. | 438/263 |
| 5,644,539 | 7/1997 | Yamagami et al. | 365/200 |
| 5,656,840 | 8/1997 | Yang | 257/316 |
| 5,694,359 | 12/1997 | Park | 365/185.09 |
| 5,754,567 | 5/1998 | Norman | 365/185.09 |
| 5,802,551 | 9/1998 | Komatsu et al. | 711/103 |

OTHER PUBLICATIONS

Lamb, R. D. (1996). "Siemens vs. Racom: Two Approaches to Dual–Interface Smart Cards", http://www.racom.com/rsc_exel.htm.

Takasu, H. (1997). "Integrated Ferroelectrics as a Strategic Device." *Integrated Ferroelectrics* 14: 1–10.

Ugon, M. (1996). *Smart Card Technology International.* London, Tim Courtney, Editor, 52–53, 56–58.

Bondurant, D. and Gnadinger., F. (1989). "Ferroelectrics for Nonvolatile RAMs." *IEEE Spectrum*: 30–33.

*Primary Examiner*—Son T. Dinh
*Attorney, Agent, or Firm*—Oliver A. Zitzmann; Steven J. Hultquist

[57] ABSTRACT

A smart card having integrated circuitry including a single chip embedded microcontroller for controlling all processes and transactions that take place on the card. The single chip embedded microcontroller comprises a processor, a non-volatile erasable PROM communicating with the processor for reading and writing information to and from the PROM, and an error check and correction circuit cooperating with the PROM to correct errors occurring during the read and write operations after the PROM has performed a greater number of read and write cycles than its endurance. By such arrangement, the accuracy of the read and write operations on the smart card is maintained beyond the endurance of said PROM, enabling PROM-based smart cards having endurance on the order of 100,000 read and write cycles.

20 Claims, 5 Drawing Sheets

SMART CARD COMPRISING INTEGRATED CIRCUITRY INCLUDING EPROM AND ERROR CHECK AND CORRECTION SYSTEM

BACKGROUND OF THE INVENTION

1. Field of the Invention

This invention relates to the use of a FLASH EPROM in a single chip embedded microcontroller (smart card). More particularly the invention relates to an error check and correction (ECC) circuit to prolong the effective endurance of read/write cycles of the FLASH EPROM and hence allow its use in smart cards.

2. Description of the Related Art

A basic contact smart card functions in much the same way that a personal computer (PC) does. Its integrated circuit (IC) has a central processing unit (CPU) or microcontroller, that controls all processes and transactions that take place on the card.

Smart card Integrated Circuits (ICs) require non-volatile storage, to hold code and changed data. Both types of storage are implemented using different technologies. Byte erasable EEPROM is used for data storage and masked ROM or one time programmable ROM is used for code storage. This results in a complex manufacturing process and a large and inflexible IC. FIG. 1 shows a typical prior art smart card having EEPROM for data storage.

EEPROM (Erasable electrically programmable read only memory) is a flexible and robust form of nonvolatile memory. Data stored on it remains there even when there is no power supply, and the data can be changed quickly and easily, although not as quickly as RAM. For these reasons, EEPROM can store a wide variety of data types, but generally stores application-specific data, personal-identification (ID) and customized feature information, and, in cases of stored-value applications, the stored value itself.

Smart cards typically need an endurance of 100,000 read/write cycles when reading/writing is byte by byte to the microcontroller on the card. Endurance is the number of read/write cycles a memory can undergo before losing the ability to store data without errors.

EEPROMs meet this requirement since the number of read/write cycles available to an EEPROM through its life cycle is approximately 100,000. EEPROM memories also meet the requirement of altering the content of the memory by single bytes (herein intended to constitute a unit of information composed of a certain number of bits, for example 8, 16, 32, etc.) without having to reprogram blocks of bytes of the memory as with the case EPROM memories. The EEPROM is able to erase certain selected cells while leaving unchanged the information content of other cells.

Bytewise erasability of EEPROM memories is achieved with a penalty in terms of compactness of the matrix of memory cells. Overall the cells are from three to four times larger than an EPROM cell, because they require a select transistor associated with each cell. In addition, the fabrication process of an EEPROM memory is notably much more complex than that of an EPROM process, and the EEPROM memory requires relatively more complex overhead circuitry as well as the integration of voltage multipliers. A schematic cross section of an EEPROM cell is shown in FIG. 2.

It would be desirable to have a non-volatile erasable PROM memory for the microcontroller in a smart card that is smaller than EEPROM but would have an endurance of 100,000 read/write cycles needed by a smart card.

SUMMARY OF THE INVENTION

The present invention provides a non-volatile erasable PROM memory for a smart card requiring an endurance of 100,000 read and write cycles. The non-volatile erasable PROM may be a FLASH EPROM. The invention is a single chip embedded microcontroller including, a processor, a FLASH EPROM communicating with the processor, and an error check and correction circuit (ECC) cooperating with the FLASH EPROM. The FLASH EPROM has an effective endurance of less than 100,000 read and write cycles, however, the ECC overcomes this deficiency. The FLASH EPROM reads and writes block segments of multiple bytes to and from the processor. The error check and correction circuit corrects errors occurring during the reading and writing of the signals after the FLASH EPROM has performed a greater number of read and write cycles than its endurance. For example, although the FLASH EPROM in one embodiment has an effective endurance of less than 78,000 read and write cycles, the smart card comprising the FLASH EPROM and the EEC overcomes this limitation with an endurance of 78,000 or more read and write cycles. This allows the microcontroller to maintain the accuracy of the read and write operations longer than the effective endurance of the FLASH EPROM, thus making it usable in a smart card.

DETAILED DESCRIPTION OF THE INVENTION

Figure 1:
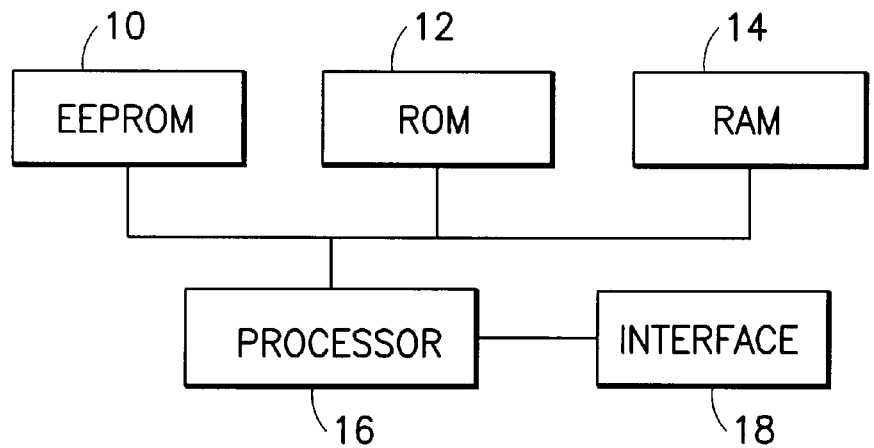
FIG. 1 is a block diagram of a prior art smart card.

FIG. 1 shows a typical prior art smart card having EEPROM 10 for data storage, ROM 12 for code storage and RAM 14 for temporary storage for processor 16. Interface 18 provides communication of external inputs to processor 16.

Figure 2:
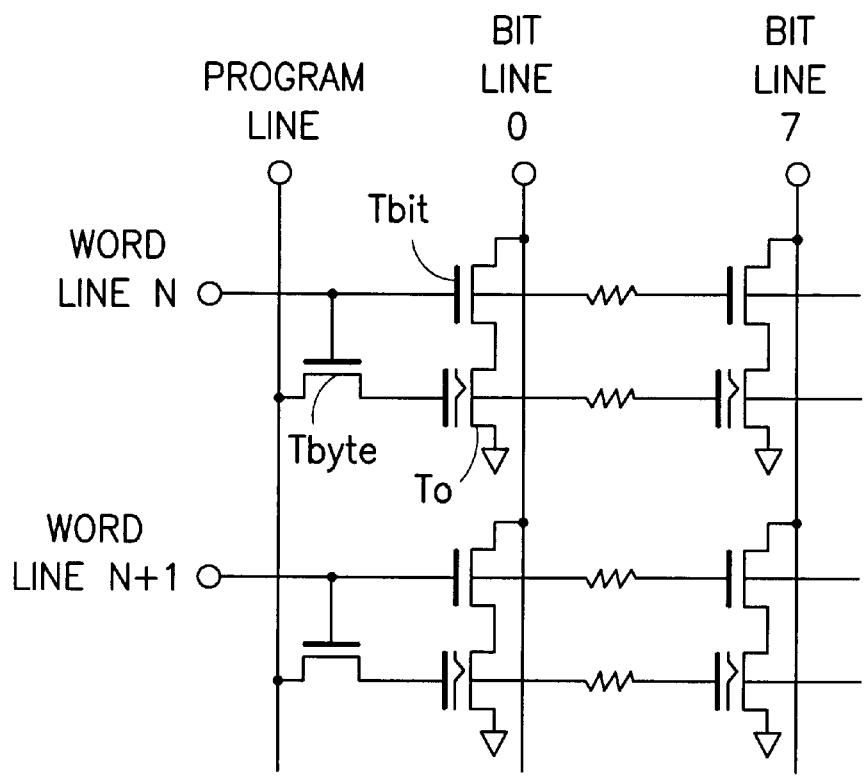
FIG. 2 is a schematic cross section of an EEPROM cell.

A schematic cross section of a prior art EEPROM cell is shown in FIG. 2. EEPROM technology is based on a memory transistor which consists of a source, channel, and drain with a floating gate over the channel and a control gate isolated from the floating gate. The act of programming the cell involves charging the floating gate with electrons, which causes the turn-on threshold of the memory cell to increase. Thus, when programmed, the cell will not turn on; that is, it will remain non-conductive, when addressed with a read potential applied to its control gate. The act of erasing the cell involves removing electrons from the floating gate to lower the threshold. With the lower threshold, the cell will turn on to a conductive state when addressed with a read potential to the control gate.

In FIG. 2, one cell needs 2⅛ transistors and a tunneling window, thus making the cell size large. The cell includes a cell transistor Tc, a bit select transistor Tbit, and shares a byte select transistor Tbyte with seven other cells. Table 1 is an operation table showing how the EEPROM of FIG. 1 can program and erase in groups of cells, by the byte (8 bits).

TABLE 1

| | PROGRAM | ERASE | READ |
|---|---|---|---|
| SELECTED WORD LINE | 20 V | 20 V | 5 V |
| UNSELECTED WORDLINE | 0 V | 0 V | 0 V |
| PROGRAM LINE | 17 V | 0 N | 0 V |
| BIT LINE 0 (ERASED) | 0 V | 17 V | 1.6 V |
| BITLINE 7 (PROGRAMMED) | 0 V | 0 V | 2.0 V |

FLASH EPROM is an alternative to the EEPROM on a smart card and solves part of the problem of large EEPROM cell size. FLASH EPROMS are fabricated on similar technology to the EEPROM but do not need a byte select transistor or a tunneling window and are hence much smaller. The term "FLASH" comes from the ability to simultaneously electrically erase an entire memory array or a large portion of the memory array in a FLASH.

FLASH EPROMs are a growing class of non-volatile storage integrated circuits which have the capability of electrically erasing, programming, and reading a memory cell in the chip. The memory cell in a FLASH EPROM is formed using so-called floating gate transistors, in which the data is stored in a cell by charging or discharging the floating gate. The floating gate is a conductive material, typically made of polysilicon, which is insulated from the channel of the transistor by a thin layer of oxide, or other insulating material, and insulated from the control gate or word line of the transistor by a second layer of insulating material. Data is stored in the memory cell by charging or discharging the floating gate.

A FLASH EPROM is organized into rows and columns. Memory cells are placed at intersections of word lines and bit lines. Each word line is connected to the gates of a plurality of memory cells in one row. Each bit line is connected to the drains of a plurality of memory cells in any column. The sources of all the memory cells are connected to a common source line. The FLASH EPROM can be programmed by a user. Once programmed, the entire contents of the FLASH EPROM can be erased by electrical erasure in one relatively rapid operation. A high erasing voltage is made available to the sources of all the cells in the FLASH EPROM simultaneously. This results in a full array erasure. The FLASH EPROM may then be reprogrammed with new information (i.e. data, commands, or signals).

Given that FLASH EPROM is electrically erasable and programmable, the processor of a microprocessor can reprogram the FLASH EPROM without removing the FLASH EPROM from the circuit to be exposed to ultraviolet radiation. This reprogramming is referred to as in-system writing ("ISW"). With ISW, the processor controls the reprogramming of the FLASH EPROM and the programming erasure voltage $V_{pp}$ is generated locally within the system.

Figure 3:
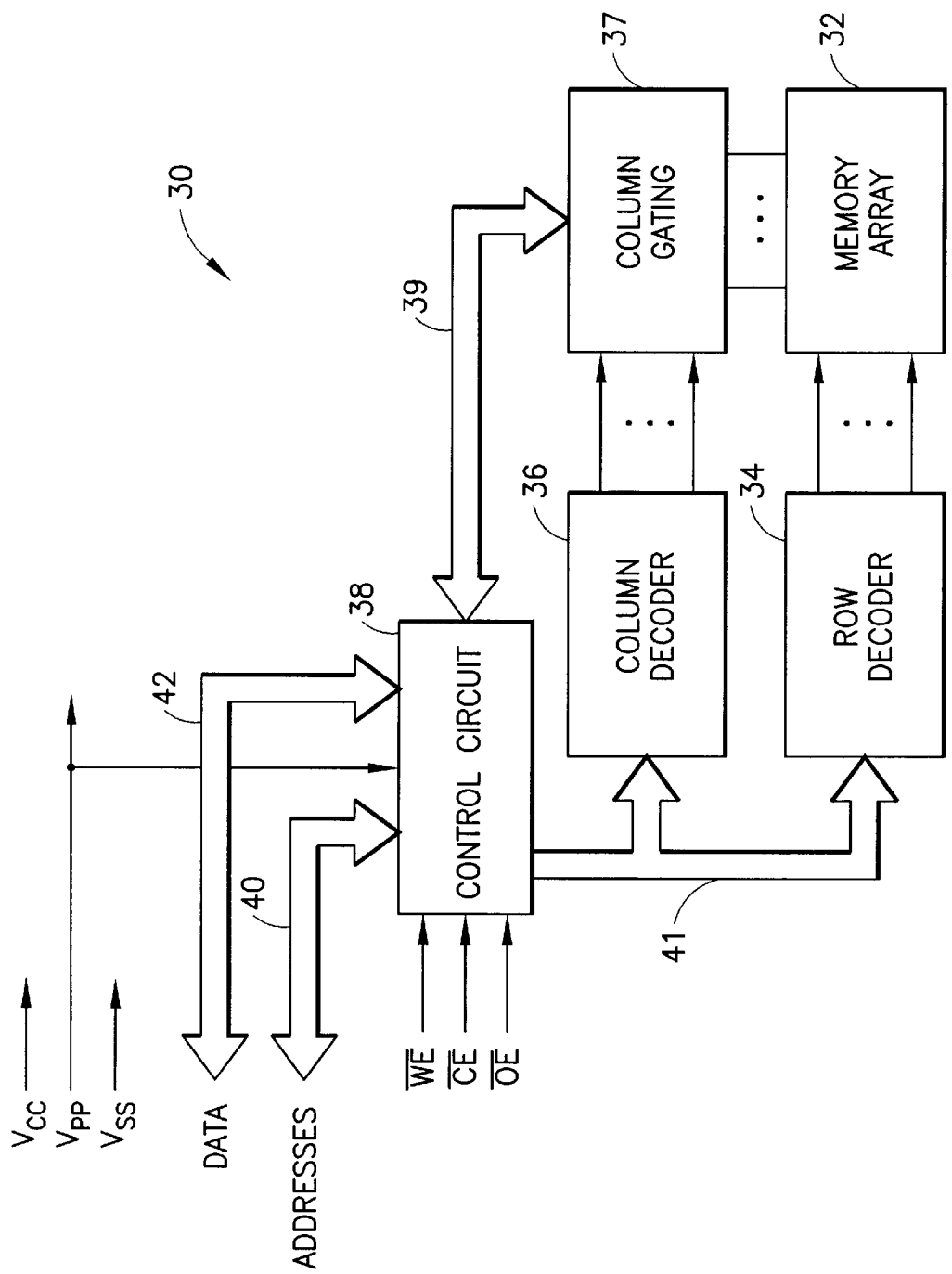
FIG. 3 is a block diagram of a FLASH EPROM.

An example of a state of the art FLASH EPROM is shown in FIG. 3. FLASH EPROM 30 includes memory array 32 coupled to row decoder 34, column decoder 36 coupled through column gating 37 to memory array 32 and control circuitry 38 coupled to column gating 37 by data path 39 and to decoders 34,36 by data path 41. Control circuitry 38 controls the memory operations. The memory operations include read, programming and erasure operations. Control circuitry 38 receives addresses from external circuitry (not shown) via address pins 40. Control circuitry 38 also receives the data to be written to memory array 32 from the external circuitry and sends the data from memory array 32 to the external circuitry via data pins 42. Data pins 42 also supply the device operation commands to control circuitry 38.

Control circuitry 38 receives control signals via their respective pins. These control signals are a chip enable control signal CE, an output enable control signal OE, and a write enable control signal WE. The chip enable CE signal is the power control signal for FLASH EPROM 30. The output enable signal OE is the output control for FLASH EPROM 30. The write enable control signal WE allows writes to control circuitry 38 while the chip enable control signal CE is active low.

The $V_{pp}$ pin receives the program/erase power supply voltage $V_{pp}$ for FLASH EPROM 30. The $V_{cc}$ pin receives the device power supply voltage for FLASH EPROM 30 and $V_{ss}$ is ground.

When the $V_{pp}$ voltage is applied to the $V_{pp}$ pin of FLASH EPROM 30, control circuitry 38 is enabled to access memory array 32 for a read, programming, or erasure operation upon receiving an appropriate command via data pins 42. The commands are written into control circuitry 38 by the logical low WE signal. When the $V_{pp}$ pin of FLASH EPROM 30 is not applied with the $V_{pp}$ voltage, control circuitry 38 is disabled from programming or erasing memory array 32 and FLASH EPROM 30 acts as a read-only memory. Meanwhile, control circuitry 38 can still be written with various commands by the logical low WE signal.

While the FLASH EPROM has the advantage that the cell size is small, the FLASH EPROM has the disadvantage that it reads and writes block by block, and it can not be used to read/write bit by bit or byte by byte.

Figure 4:
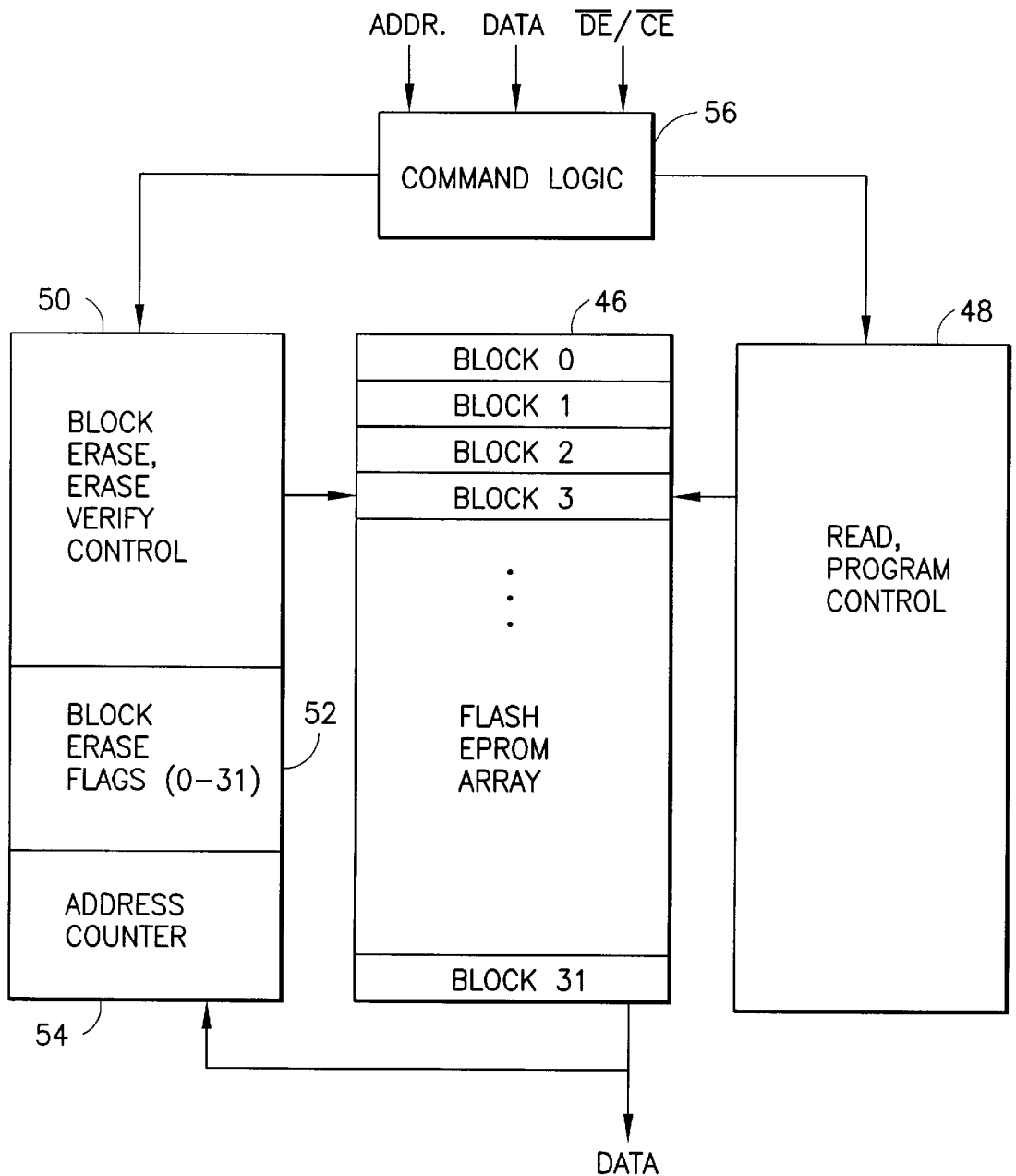
FIG. 4 shows a block diagram of the logic of a FLASH EPROM for reading/writing bytes in block segments.

FIG. 4 shows a block diagram of the logic of a FLASH EPROM for reading/writing signals in blocks. Such logic is shown in U.S. Pat. No. 5,596,530 herein incorporated by reference. The circuit includes a FLASH EPROM array, generally 46, which is divided into a plurality of blocks (32 blocks in the figure). For example, this array could be memory array 32 shown in FIG. 3. Coupled with the array 46 are a read and program control circuit, generally 48, and a block erase and erase verify control circuit, generally 50. The block erase and erase verify control circuit 50 includes a plurality of block erase flags 52 and an address counter 54 for incrementing through memory cells for the erase verify sequence. The chip includes command logic 56 which is coupled to the address, data, and other control lines, such as the output enable and chip enable signals. The command logic 56 interprets inputs to set a mode of operation for the read and program control logic 48 and the block erase and erase verify control logic 50.

In response to commands issued by the command logic 56, an embedded block erase operation is executed by state machines in the block erase and erase verify control logic 50. The user, through a host CPU or otherwise, supplies address and data signals to the command logic 56 to indicate a preferred mode of operation. The modes relevant to the present invention include a chip erase mode in selected blocks in the array that are to be erased. Blocks to be erased are identified by the erase flags 52. Because of the architecture of the FLASH EPROM array 46, the blocks within the array are segmentable for the erase operation.

The fact that the FLASH EPROM reads and writes information block by block affects its endurance. In the past it was typical to read/write in blocks of 128 bytes. Currently, EPROMS have improved on this so that blocks of 4 bytes may be read and written. The problem arises because each time a byte is to be read, the whole block of 4 bytes needs to be read out. This reduces the endurance for the three unneeded bytes that were read out. This reduced endurance is the effective endurance of the FLASH EPROM and is less than its actual endurance. For example a smart card needs an endurance of 100,000 read/write cycles. A FLASH EPROM has an actual endurance of 100,000 read/write cycles but the effective endurance is only about 25,000 read/write cycles because 4 bytes must be read out for each one byte needed. This makes it unusable for a smart card unless the endurance is extended in some manner.

After the FLASH EPROM has exceeded its reliable life cycle the FLASH EPROM still functions but errors occur in information read out during a read/write cycle.

Figure 5:
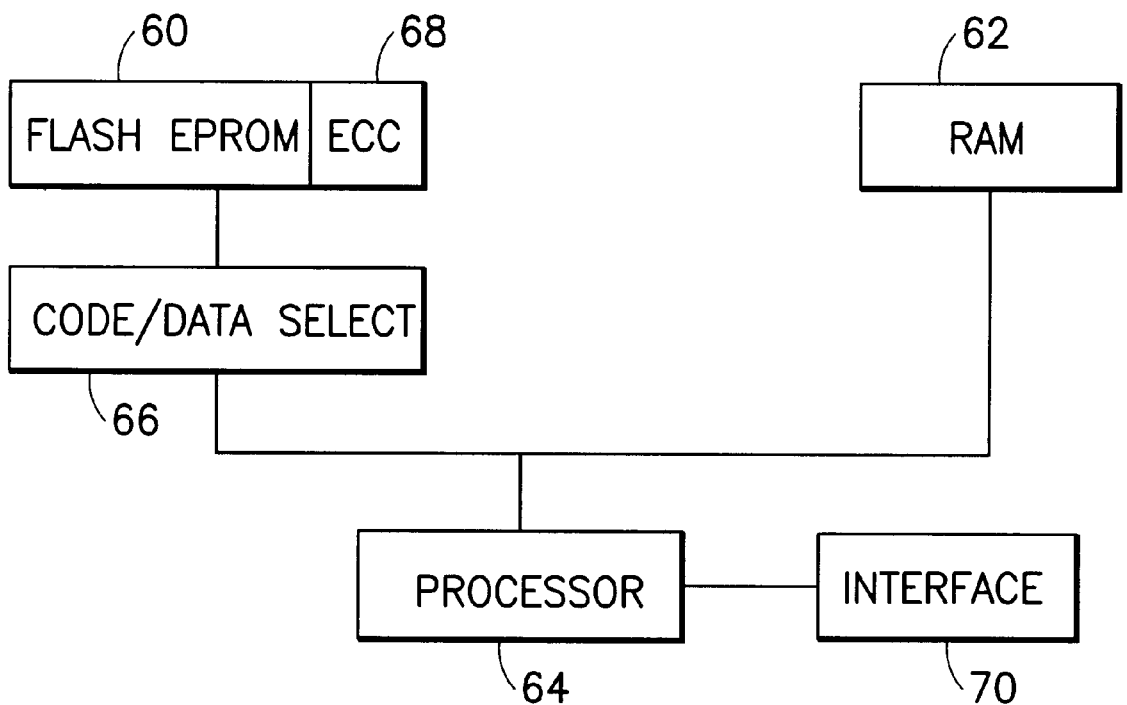
FIG. 5 shows a block diagram of a FLASH EPROM using an error check and correction circuit (ECC).

To overcome this difficulty an error check and correction circuit (ECC) is provided with the FLASH EPROM to check and correct defective memory cell readings. FIG. 5 shows a block diagram of a smart card with a FLASH EPROM using an error check and correction circuit (ECC). In FIG. 5 a smart card has FLASH EPROM 60 for data storage, RAM 62 for code storage and for temporary storage for processor 64 and code/data select 66 to select the correct information from RAM 62 for processor 64. Error check and correction circuit (ECC) 68 corrects errors in the output of FLASH EPROM 60. Interface 70 provides communication of external inputs to and outputs to processor 64.

Figure 6:
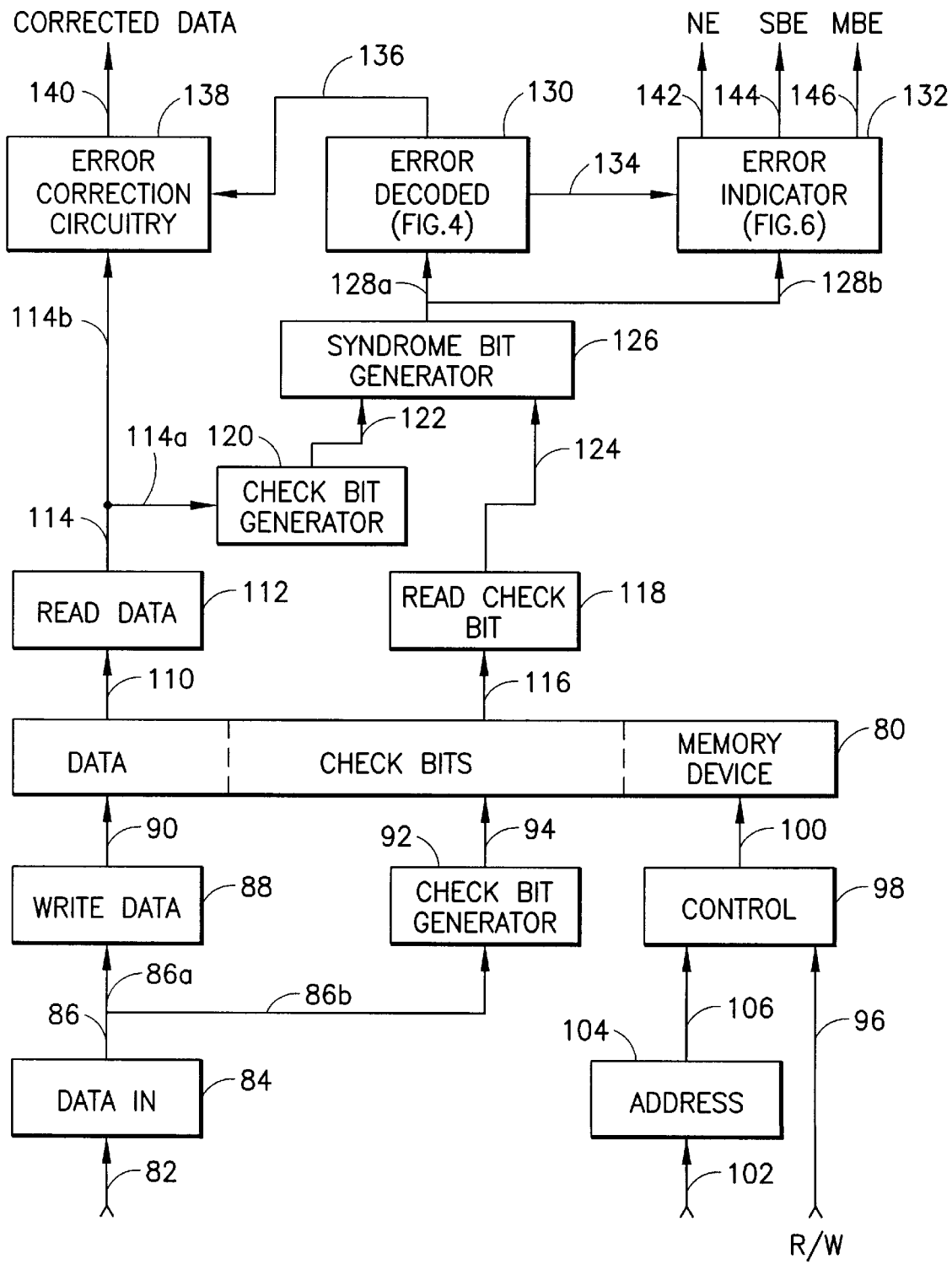
FIG. 6 is a block diagram of a typical error check and correction circuit (ECC).

Error check and correction circuits are well known in the art, for example, U.S. Pat. No. 4,523,314, herein incorporated by reference. FIG. 6 shows a block diagram of an error correction code system such as that shown in U.S. Pat. No. 4,523,314.

In FIG. 6 a data processing system utilizes a data processing unit (not shown) for performing programmed manipulation of data words. Accordingly, the data processing system also requires the facility for storing data words and instruction words, and accessing data words and instruction words thus stored. The memory system of FIG. 1 includes a memory device 80, of a type available in the prior art, and capable of accessing a plurality of data bits together with a grouping of check bits associated therewith. Individually accessed groupings of data bits are referred to as data words. It is understood that the memory device 80, may be read only memory (ROM), or random access memory (RAM). Both types of memory devices can provide for the arbitrarily defined access to addressable locations for readout.

The memory system is arranged for receiving data signals on line 82 from a source (not shown), where it is assembled in the appropriate format in the data in circuitry 84. Depending upon the type of memory system, the data bits received on line 82 can be received serially, in parallel by addressable word, in parallel by a subset such as a byte of an addressable word, and can be accompanied by through-checking parity bits. It is the function of the data in circuitry 84 to accommodate the protocol of the transmission, and assemble data words for recording in the memory device 80. Characteristically, the data words to be recorded are provided with the bits in parallel on line 86. For example, if a 36-bit data word is to be recorded, there would be 36 conductive paths in line 86, plus the number of conductors required for through-checking parity, if any. Data words to be recorded are provided on line 86a to the write data circuitry 88, which functions to provide drive signals on line 90 for activating the drive circuits in the memory device 80.

At the same time, the data words are provided on line 86b to the check bit generator 92 where check bits are generated and provided for recording on line 94 to the check bit portion of the memory device 80. The check bits are individually generated for predetermined bit groupings within the data word, as will be described further below, each check bit being a parity bit for its associated bit grouping. The check bit generator 92 can be a set of parity generators, each responsive to the predetermined bit grouping of the applied data words. The parity function is basically generated by forming the exclusive OR of all of the predetermined bits for the particular check bit.

In order to control the reading or writing function of memory device 80, a read or write selection R/W is received on line 96. This function selection is applied to the control circuitry 98, which functions to control the operation of the memory device 80 through signals provided on line 100.

In order to determine the addressable location at which writing will occur or from which reading will be made, a memory address is received on line 102, is applied to the address circuitry 104, and the resultant signals to control addressing are provided on line 106 to control 98. The control 98 provides timing, and such other control signals as are necessary to control the reading and writing in the particular type of memory device 80 utilized. All of these circuits and functions are known and available generally in the prior art.

When data words have been recorded in the memory device 80, and it is determined that it is desirable to access and read out any selected one of such data words, a read signal is received on line 96 with the specified address received on line 102. The control 98 causes the memory device to provide the specified read data signals on line 110, which are made available by the read data circuitry 112 on line 114. At the same time, the addressed check bits for the associated addressed data words are provided on line 116 to the read check bits circuitry 118. The read data bits are provided on line 114a to the check bit generator.

The syndrome bit generator 126 is responsively coupled to receive the check bits read from memory device on line 124 and the check bits that are reconstituted from the read data provided by check bit generator 120 on line 122. The syndrome bits are generated by performing the exclusive OR function of the reconstituted read check bits with associated ones of the check bits read from the memory device. For the illustrative embodiment shown, there are six syndrome bits S0 through S5 thus generated. The seventh, or total syndrome bit, identified as S6, is formed by performing the exclusive OR function of all of the data bits and check bits as read from memory device 80. The generation of syndrome bits is well known in the art.

The syndrome bits are applied on line 128a to error decoder 130 and on line 128b to the error indicator circuitry 132. The error decoder circuitry provides control signals on line 134 to error indicator circuitry 132. The error decoder circuitry 130 provides signals on line 136 to error correction circuitry 138 correct correctable errors in the read data received on line 114b and provide corrected data out on line 140. The error indicator circuitry 132 provides a signal on line 142 when no error NE is detected, on line 144 when a single bit error SBE is detected, and line 146 when a multiple bit error MBE is detected.

The FLASH EPROM used in the smart card of FIG. 5 incorporates an ECC circuit so that the FLASH EPROM may be used beyond the number of read/write cycles in its endurance. The ECC circuit corrects errors that occur in read/write cycles beyond the endurance of the FLASH EPROM. In this way the effective endurance of the FLASH EPROM may be extended to the 100,000 read/write cycles necessary for a smart card.

While the preferred embodiments of the invention have been shown and described, numerous variations and alternative embodiments will occur to those skilled in the art. Accordingly, it is intended that the invention be limited only in terms of the appended claims.

We claim:

1. A smart card, comprising:
   integrated circuitry including a single chip embedded microcontroller for controlling all processes and transactions that take place on the card, wherein the single chip embedded microcontroller comprises:
   a processor;
   a non-volatile erasable PROM communicating with said processor, said processor capable of reading and writing information to and from said PROM in successive read and write operations; and
   an error check and correction circuit cooperating with said PROM to correct errors occurring during the reading and writing of said information to and from said PROM after said PROM has performed a greater number of read and write cycles than its endurance whereby the accuracy of said read and write operations on the smart card is maintained beyond the endurance of said PROM.

2. The smart card of claim 1 in which said processor is capable of reading and writing information to and from said PROM in block segments of multiple bytes.

3. A smart card, comprising:
   integrated circuitry including a single chip embedded microcontroller for controlling all processes and transactions that take place on the card, wherein the single chip embedded microcontroller comprises:
   a processor,
   a FLASH EPROM communicating with said processor, said processor capable of reading and writing information to and from said FLASH EPROM, and
   an error check and correction circuit cooperating with said FLASH EPROM to correct errors occurring during read and write operations comprising the reading and writing of said information to and from said FLASH EPROM after said FLASH EPROM has performed a greater number of read and write cycles than its endurance whereby the accuracy of said read and write operations on the smart card is maintained beyond the endurance of said FLASH EPROM.

4. The smart card of claim 3 in which said processor is capable of reading and writing information to and from said FLASH EPROM in block segments of multiple bytes.

5. The smart card of claim 4 in which said smart card has an endurance of at least 78,000 read/write cycles.

6. The smart card of claim 1 in which said FLASH EPROM has an effective endurance of less than 78,000 read and write cycles.

7. A method of extended endurance operation of a smart card, comprising:
   providing a smart card as in claim 1;
   operating said processor in said smart card to read and write information to and from said non-volatile erasable PROM in successive PROM read and write cycles; and
   checking information errors in each PROM read and write cycle exceeding the PROM's effective endurance and correcting said errors with said error check and correction circuit, to maintain the accuracy of said read and write operations longer than the effective endurance of said PROM.

8. A method of extended endurance operation of a smart card according to claim 7 in which said processor reads and writes information to and from said non-volatile erasable PROM in block segments of multiple bytes.

9. A method of extended endurance operation of a smart card according to claim 7 in which said non-volatile erasable PROM is a FLASH EPROM.

10. A method of extended endurance operation of a smart card according to claim 9 in which said processor reads and writes information to and from said FLASH EPROM in block segments of multiple bytes.

11. The method of extended endurance operation of a smart card according to claim 7 in which said smart card has an endurance of at least 78,000 read and write cycles.

12. A method of extended endurance operation of a smart card, comprising:
   providing a smart card as in claim 1;
   operating said FLASH EPROM in said smart card so that the number of FLASH EPROM read and write cycles; and
   checking errors in each FLASH EPROM read and write cycle exceeding the FLASH EPROM's effective endurance and correcting said errors with said error check and correction circuit thereby allowing said smart card to maintain the accuracy of said read and write operations longer than the effective endurance of said FLASH EPROM.

13. A smart card according to claim 1, having an endurance of at least 78,000 read and write cycles.

14. A smart card according to claim 1, having an endurance in a range of from 78,000 to 100,000 read and write cycles.

15. A smart card according to claim 1, wherein the smart card contains no EEPROM components.

16. A method according to claim 7, wherein the smart card has an endurance in a range of from 78,000 to 100,000 read and write cycles.

17. A method according to claim 7, wherein the smart card contains no EEPROM components.

18. A method according to claim 7, wherein the smart card (i) has an endurance in a range of from 78,000 to 100,000 read and write cycles, and (ii) contains no EEPROM components.

19. A method according to claim 12, wherein the smart card has an endurance in a range of from 78,000 to 100,000 read and write cycles.

20. A method according to claim 12, wherein the smart card contains no EEPROM components.

* * * * *

UNITED STATES PATENT AND TRADEMARK OFFICE
CERTIFICATE OF CORRECTION

PATENT NO : 6,108,236
DATED : August 22, 2000
INVENTOR(S) : Philip C. Barnett, et al.

It is certified that error appears in the above-identified patent and that said Letters Patent is hereby corrected as shown below:

On the title page
[75] Inventors: after "Philip C. Barnett" insert --Peter S. Kirlin --

[56] Attorney, Agent, or Firm: Cancel "Oliver A. Zitzmann and Steven J. Hultquist" and substitute --Oliver A. Zitzmann, and David G. Rasmussen--.

Signed and Sealed this

First Day of May, 2001

Attest:

NICHOLAS P. GODICI

Attesting Officer

Acting Director of the United States Patent and Trademark Office